US008950763B2

(12) United States Patent
Jakob (10) Patent No.: US 8,950,763 B2
(45) Date of Patent: Feb. 10, 2015

(54) VEHICLE INDEPENDENT WHEEL SUSPENSION FOR A SLIGHTLY STEERABLE REAR WHEEL OF A DOUBLE-TRACK VEHICLE

(71) Applicant: Bayerische Motoren Werke Aktiengesellschaft, Munich (DE)

(72) Inventor: Benjamin Jakob, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/051,741

(22) Filed: Oct. 11, 2013

(65) Prior Publication Data

US 2014/0054871 A1 Feb. 27, 2014

Related U.S. Application Data (63) Continuation of application No. PCT/EP2012/054840, filed on Mar. 19, 2012.

(30) Foreign Application Priority Data

Apr. 13, 2011 (DE) .......................... 10 2011 007 283

(51) Int. Cl.
*B60G 3/20* (2006.01)
*B60G 3/18* (2006.01)
(Continued)

(52) U.S. Cl.
CPC ...... *B60G 3/18* (2013.01); *B60G 7/006* (2013.01); *B60G 2200/182* (2013.01);
(Continued)

(58) Field of Classification Search
CPC ........ B62D 7/146; B62D 7/16; B62D 5/0418; B62D 7/14; B60G 3/202; B60G 7/003; B60G 3/18; B60G 3/20; B60G 21/05; B60G 7/006; B60G 7/005

USPC ..................... 280/124.148, 124.134, 124.135
See application file for complete search history.

(56) References Cited

U.S. PATENT DOCUMENTS

| 4,440,419 A | 4/1984 | Kosak et al. |
| 4,529,222 A * | 7/1985 | Kijima et al. .......... 280/124.128 |

(Continued)

FOREIGN PATENT DOCUMENTS

| DE | 38 27 039 A1 | 2/1990 |
| DE | 39 39 312 A1 | 5/1990 |

(Continued)

OTHER PUBLICATIONS

International Search Report (PCT/ISA/210) dated Jul. 5, 2012 with partial English translation (Eight (8) pages).

(Continued)

*Primary Examiner* — Karen Beck
(74) *Attorney, Agent, or Firm* — Crowell & Moring LLP (57) ABSTRACT

A vehicular single wheel suspension of a double-track rear wheel being steerable by an actuator of a double-track vehicle has a wheel carrier guided by a longitudinal control arm and by two transverse control arms. The transverse control arms are connected to the wheel carrier by a bolt via a rubber bearing having a minimal degree of rotary freedom. The longitudinal control arm is mounted on the wheel carrier via one rubber bearing having a minimal degree of rotary freedom, such that the wheel carrier is swivelable relative to the longitudinal control arm about a substantially vertical swivel axis. The swivel axis is formed by the rubber bearing wherein the resulting degree of rotary freedom is bound by a tie rod element connected to the wheel carrier via an articulated joint. The tie rod element is movable in the transverse direction of the vehicle by an actuator adjuster element.

16 Claims, 5 Drawing Sheets

(51) Int. Cl.
  *B60G 7/00* (2006.01)
  *B62D 5/04* (2006.01)
  *B62D 7/14* (2006.01)
  *B62D 17/00* (2006.01)

(52) U.S. Cl.
  CPC .... *B60G 2200/4622* (2013.01); *B60G 2202/42* (2013.01); *B60G 2204/1484* (2013.01); *B62D 5/0418* (2013.01); *B62D 7/146* (2013.01); *B62D 17/00* (2013.01)
  USPC .................................................. 280/124.148

(56) References Cited

U.S. PATENT DOCUMENTS

| | | | |
|---|---|---|---|
| 4,695,069 A * | 9/1987 | Kurokawa et al. | 280/93.502 |
| 4,709,935 A * | 12/1987 | Takizawa et al. | 180/414 |
| 4,978,131 A | 12/1990 | Edahiro et al. | |
| 5,340,146 A * | 8/1994 | Kato | 280/124.143 |
| 7,431,315 B2 * | 10/2008 | Jargowsky et al. | 280/124.128 |
| 8,306,701 B2 * | 11/2012 | Yanagi | 701/41 |
| 2014/0035251 A1 * | 2/2014 | Glanzer et al. | 280/124.136 |
| 2014/0054871 A1 * | 2/2014 | Jakob | 280/124.134 |

FOREIGN PATENT DOCUMENTS

| | | |
|---|---|---|
| DE | 10 2004 017 639 A1 | 10/2005 |
| DE | 10 2006 055 294 A1 | 5/2008 |
| DE | 10 2006 055 295 A1 | 5/2008 |
| DE | 10 2006 055 288 A1 | 6/2008 |
| DE | 10 2009 004 123 A1 | 7/2010 |
| DE | 102011077750 A1 * | 12/2012 |
| DE | 102011077751 A1 * | 12/2012 |
| EP | 0 052 663 B1 | 6/1984 |
| JP | 62-110506 A | 5/1987 |

OTHER PUBLICATIONS

German Search Report dated Nov. 7, 2011 with partial English translation (Ten (10) pages).

* cited by examiner

VEHICLE INDEPENDENT WHEEL SUSPENSION FOR A SLIGHTLY STEERABLE REAR WHEEL OF A DOUBLE-TRACK VEHICLE

CROSS REFERENCE TO RELATED APPLICATIONS

This application is a continuation of PCT International Application No. PCT/EP2012/054840, filed Mar. 19, 2012, which claims priority under 35 U.S.C. §119 from German Patent Application No. DE 10 2011 007 283.7, filed Apr. 13, 2011, the entire disclosures of which are expressly incorporated by reference herein.

This application contains subject matter related to U.S. application Ser. No. 14/052,171, entitled "Independent Wheel Suspension of an at Least Slightly Steerable Rear Wheel of a Double-Track Vehicle," filed on Oct. 11, 2013.

BACKGROUND AND SUMMARY OF THE INVENTION

The invention relates to a single wheel suspension of a rear wheel, the same being steerable, at least minimally, by way of an actuator, of a vehicle having two wheel paths (a double-track vehicle). The wheel carrier of the suspension is guided by a longitudinal control arm which extends substantially in the longitudinal direction of the vehicle, as well as by two transverse control arms which extend at least approximately in the transverse direction of the vehicle, and which are positioned in different planes when viewed in the longitudinal direction of the vehicle, and do not intersect with each other. The other ends of the transverse control arms, opposite the wheel carrier, are connected either directly or indirectly to the vehicle construction in a manner allowing at least minimal articulation, and the other end of each transverse control arm is attached to the wheel carrier by a bolt or the like via a rubber bearing or a joint which has at least a minimal degree of rotary freedom. Reference is hereby made particularly to U.S. Pat. No. 4,709,935, as well as to EP 0 052 663 B1 and DE 38 27 039 A1 as relevant prior art.

EP 0 052 663 B1 discloses what is also called a central pivot axle among specialists, and this is characterized by an advantageous kinematic behavior, particularly when used in a driven wheel, and is also more advantageous than the known, so-called semi-trailing arm axle. DE 38 27 039 A1 shows one option for making it possible for a wheel guided in such a manner to be minimally steered. In this case, the toe angle of this wheel can be adjusted by use of an actuator which suitably engages with a bearing of the longitudinal control arm, said bearing being positioned on the vehicle construction. Such a minimally steerable axle is shown in its entirety in the closest prior art, U.S. Pat. No. 4,709,935. This known arrangement requires additional construction space, not only at the position of the longitudinal control arm bearing on the vehicle construction, but also in the immediate proximity of the longitudinal control arm, for the horizontal articulation thereof (in the transverse direction of the vehicle). Depending on the form of the vehicle construction in this region, such constructed space may not be available.

In the present case, the problem is that of detailing how it is possible to design a single wheel suspension and/or vehicle axle in a manner allowing minimal steering of the same, while preserving the fundamental kinematic and elastokinematic properties of such a wheel suspension, without a greater need for constructed space in the end region of the longitudinal control arm closest to the vehicle construction.

The solution to this problem is characterized in that the longitudinal control arm is also attached to the wheel carrier by way of the two named bolts or the like, in each case via one rubber bearing or at least one joint (the bearing or joint may be referred herein simply as a joint) having at least one minimal degree of rotary freedom, in such a manner that the wheel carrier is able to swivel relative to the longitudinal control arm, at least minimally, about a swivel axis which runs substantially vertically and which is formed by this rubber bearing or joint. The resulting degree of rotary freedom of the wheel carrier is bound by a tie rod element which is connected to the wheel carrier via an articulated joint, wherein the tie rod element can be moved at least sectionally in the transverse direction of the vehicle by way of the actuator.

According to the invention, as in the case of DE 38 27 039 A1 described above, the wheel carrier is not only able to swivel at least to a small degree with respect to the two transverse control arms, but also with respect to the longitudinal control arm, about a swivel axis which runs substantially vertically, such that—in contrast to this known prior art—the longitudinal control arm itself does not need any freedom of movement relevant for the present invention in the transverse direction of the vehicle. The swivel axis (also called a kingpin axis or rotary steering axis) in this case is formed by two joints or rubber bearings, or the like, via which the wheel carrier is connected to the longitudinal control arm.

According to the invention, the latter two joints or rubber bearings are attached with the same bolts or the like with which the joints or rubber bearings of the two transverse control arms are attached. The two joints or the like are preferably press-fitted into suitable recesses of the wheel carrier and each fastened by a bolt or the like on the longitudinal control arm, wherein a rubber bearing which is also press-fit into a transverse control arm is also fastened on the longitudinal control arm by way of the bolt or the like. By means of this particularly advantageous arrangement or connection, not only are the space requirements minimized, but also the assembly process is kept as simple as possible, because only two bolted connections—namely via the two bolts—are required to connect the wheel carrier to the longitudinal control arm and the two transverse control arms.

By way of example, two so-called flanged bearings can be configured on the wheel carrier, which extend substantially in the vertical direction and at least approximately in the transverse direction of the vehicle, and therefore (each) describe a plane which is at least approximately perpendicular to the longitudinal direction of the vehicle. The two flanged bearings can lie in a common plane or in planes which are only minimally separated from each other. By way of example, a pivot joint (cf. for example DE 10 2004 017 639 A1) can be press-fit by its joint housing ("head") into each such flanged bearing, the pivot pin of which extends substantially horizontally, at least approximately in the longitudinal direction of the vehicle, and also passes through at least one flange or one mounting link of the longitudinal control arm, and furthermore accommodates a rubber bearing press-fit into one of the two transverse control arms, which is supported, for example with a spacer in between, by the flange (and/or by the mounting link) of the longitudinal control arm, and is held by a nut screwed onto the free end of the pivot pin and/or is tensioned as a whole against the longitudinal control arm flange (or mounting link). In this case, the pivot pin of the pivot joint therefore forms the bolt named in the independent claim, and said swivel axes describe the center point of the joint ball of the two pivot joints.

As an alternative, instead of such a pivot joint given by way of example, conventional rubber bearings or ball joints ("ball bushing joints"), or in general joints having at least one minimal degree of rotary freedom, meaning that the same extends over a sufficient angular range, can be suitably inserted into the flanged bearing of the wheel carrier, said flanged bearing likewise being given only by way of example. The joints then each are fastened on the longitudinal control arm and/or tensioned against the same by use of a bolt, preferably a screw, and optionally with a spacer in-between, together with a rubber bearing or joint of one of the two transverse control arms.

It is hereby expressly stated again that the flanged bearing of the wheel carrier, described above, is only one possible example of an embodiment of the present invention. Alternative embodiments are possible, of course; what is essential is that the wheel carrier is connected to the longitudinal control arm via two joints or rubber bearings or the like, the same forming a swivel axle which runs substantially vertically, in each case by way of a bolt or the like, wherein each bolt furthermore serves the purpose of attaching one of the transverse control arms on the longitudinal control arm via a further joint or rubber bearing or the like. The arrangement of each rubber bearing or joint on the bolt in this case can have one or two link points, meaning that instead of the named flanged bearing, two mounting links positioned next to each other can be included, each of which describe a plane which is at least approximately perpendicular to the longitudinal axis of rotation, between which a rubber bearing, for example, is tensioned by use of the named bolt. Of course, the longitudinal control arm can also be fastened to the wheel carrier in an articulated manner, by two joints being inserted in a suitable manner into the longitudinal control arm, wherein each of the joints is fastened to the wheel carrier by use of a bolt, and wherein one of the two transverse control arms is fastened to the wheel carrier by use of the same bolt.

The swivel axis and/or the joints or the like which form the same, wherein the wheel carrier according to the invention is able to pivot about the same relative to the longitudinal control arm, creates and/or create a degree of freedom which according to the invention is bound by a so-called tie rod element which can be moved at least sectionally, in the transverse direction of the vehicle, by way of an actuator (servomotor). During such a movement, the articulation point of the tie rod element on the wheel carrier describes a (short) semicircular curve, the mid-point of which is on the swivel axis. Due to external forces applied to the vehicle wheel attached in a rotatable manner on the wheel carrier, relative movements between the wheel carrier and the actuator, the same attached at a suitable point on the wheel suspension or on the vehicle construction near the wheel suspension can occur, for which reason the tie rod element should be articulated on the wheel carrier and/or on a movable adjuster element of the actuator in such a manner that at least the adjuster element of the actuator, and preferably also the tie rod element itself, is kept substantially free of transverse forces and torques which are not oriented about the axis of the adjuster element or the tie rod element. In this way, damage to the actuator resulting from such external forces (wheel cornering forces, longitudinal wheel forces, and vertical forces) is ruled out.

In principle, one dedicated actuator can be functionally assigned to each wheel carrier of the rear axle, said actuator then preferably being mounted on the longitudinal control arm, or a single actuator can be configured for the two wheel carriers of the rear axle, said actuator being arranged substantially in the center and mounted on an axle carrier, or alternatively on the vehicle body, by way of example. In principle, the mounting of the actuator can be rigid or itself articulated. The latter configuration presents the possibility of the adjuster element of the actuator, which can be a spindle which can be moved longitudinally by an electric motor (as an actual actuator) via a suitable gearing (as a component of the actuator), being kept isolated from transverse forces and torque applied to this spindle, wherein the same can result from forces acting externally on the wheel carried by the wheel carrier. In this case, the articulated mounting of the actuator must of course be designed in such a manner that the movement of the actuator adjuster element is transmitted to the tie rod element connected to the same without modification.

Forces which are applied to the wheel carried by the wheel carrier have already been mentioned, the same being absorbed as usual via the two transverse control arms and the longitudinal control arm, as well as a suspension spring element on the vehicle body. According to the design of the joints between the wheel carrier and the longitudinal control arm, said joints forming said swivel axis, it may be practical to include a further support, the same being preferably slightly elastic, between the wheel carrier and the longitudinal control arm, wherein the further support would then need to have a degree of freedom for the swivel movement of the wheel carrier relative to the longitudinal control arm, the swivel movement created by the actuator. In order to therefore support the wheel carrier on the longitudinal control arm in a more robust and stiffer manner, without placing loads on the moving adjuster element of the actuator, an additional load path, which is preferably in front of the swivel axis when viewed in the direction of travel, can be configured or implemented between the wheel carrier and the longitudinal control arm. This load path particularly is able to function in the vertical direction, because this is the direction of the largest loads, and because the two other load paths leading through the joints (or rubber bearings) which form the swivel axis are relieved of load by way of such an additional load path in the form of a further support.

In summary, multiple embodiments, which are not exhaustively detailed below, therefore exist for embodying the connection between the actuator—and more precisely the actuator adjuster element—and the wheel carrier, said connection forming the degree of rotary freedom of the wheel carrier about the swivel axle.

One embodiment is the connection, mentioned above, via a tie rod element, which is arranged by way of example in the manner of a stabilizer bar connecting link, wherein a transmission of force is only possible in one (single) direction—particularly the longitudinal direction of the tie rod element. In this case, the actuator (formed as mentioned above by a gearing with an electric motor, for example) can be rigidly connected to the longitudinal control arm. By means of an arrangement of the actuator effectively inside the longitudinal control arm, the actuator requires only a small amount of constructed space, but as a result the strength of the longitudinal control arm can initially be lowered for the necessary passage of the actuator adjuster element, which can then be compensated for by a careful incorporation of the actuator housing into the longitudinal control arm as a load-bearing structure. According to an alternative embodiment, the actuator can be a component of the tie rod element, and therefore can be mounted, as mentioned above, in an articulated manner, on the longitudinal control arm, for example (in this case, each wheel of the vehicle rear axle has its own actuator), or directly or indirectly on the vehicle construction with an axle carrier or the like in-between, wherein it is possible in this case to also configure an actuator, which is preferably arranged centrally, for both wheels of the rear vehicle axle, in addition to two actuators, each of which is dedicated for one wheel.

A further embodiment for binding the degree of freedom, the same realized by the swivel axis, of the wheel carrier, with respect to the longitudinal control arm, consists of a tie rod element as explained above, and the support, the same also described above, of the wheel carrier with respect to the additional element which implements the longitudinal control arm. In addition to the tie rod element, the segment of the wheel carrier which is close to the connection of the tie rod element is connected to the longitudinal control arm via such an additional element, which at least has the degree of freedom necessary for the steering movement or pivot movement of the wheel carrier. The wheel carrier is connected more stiffly to the longitudinal control arm via this additional element, and load is removed from the two force paths or load paths via the joints which form the swivel axle. Of course, the additional element can also be connected to the housing of the actuator and/or supported on the same, particularly if the same is designed as a structure of the longitudinal control arm which also is load-bearing, as mentioned above. As an advantageous implementation which is figuratively illustrated as a potential embodiment, and is also described below, the tie rod element can be constructively integrated into the additional element, meaning into the additional support between the wheel carrier and the longitudinal control arm.

Figure 4:
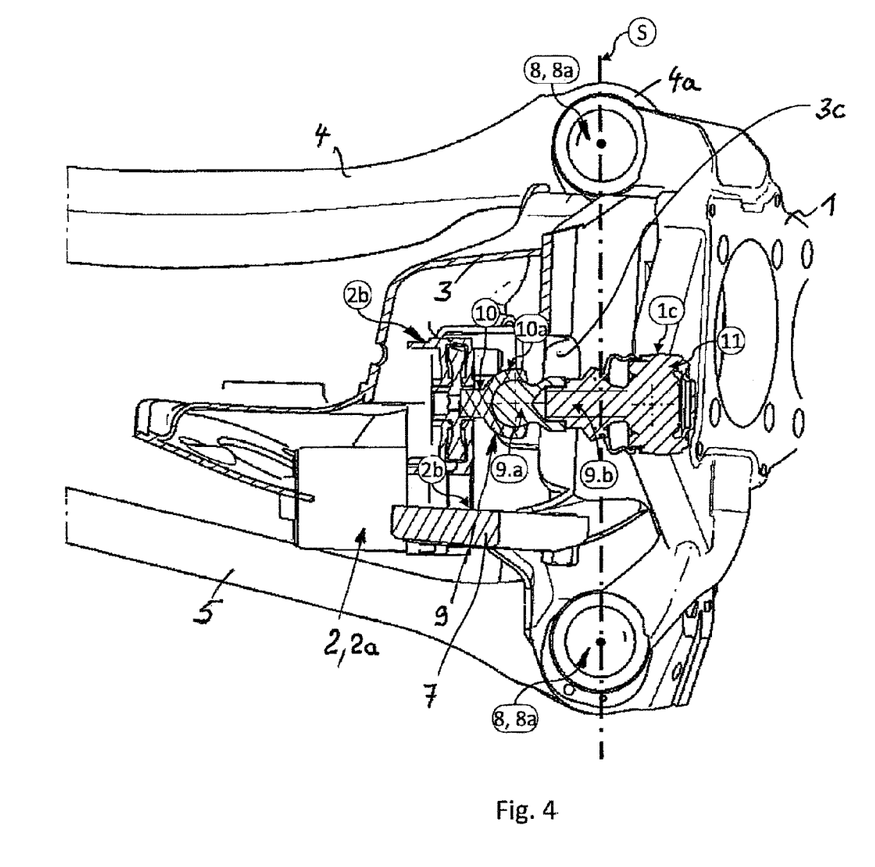
FIG. 4 is an enlarged detail view, which is partially cross-sectioned in a view taken along the longitudinal direction of the vehicle, opposite the direction of travel, facing rearwards.
Figure 5:
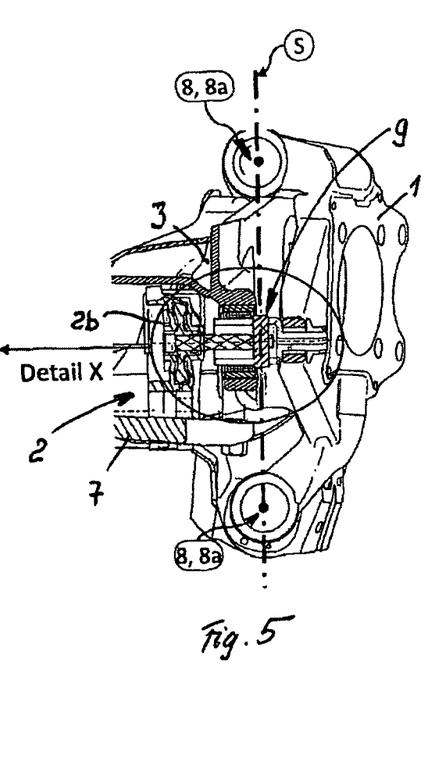
FIG. 5 is a view showing a comparable detail to FIG. 4, of a second embodiment.
Figure 5A:
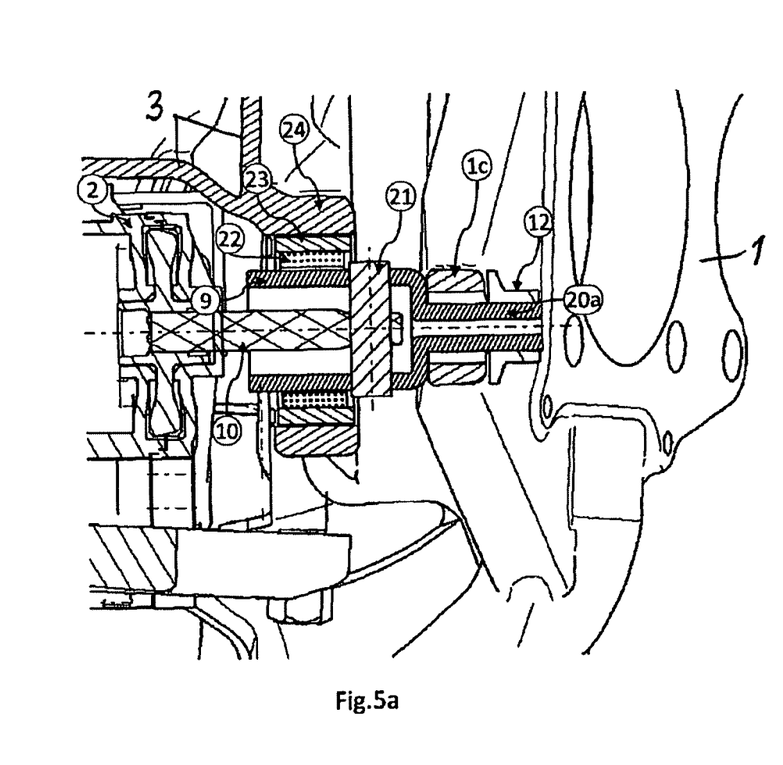
FIG. 5a is an enlarged view of detail X for FIG. 5.

The invention is described in greater detail using two embodiments, of which a first (without an additional element as named in the previous paragraph) is illustrated in FIGS. 1-4, while FIG. 5 shows a detail, shown enlarged in FIG. 5a, of a second embodiment, having such an additional element.

Other objects, advantages and novel features of the present invention will become apparent from the following detailed description of one or more preferred embodiments when considered in conjunction with the accompanying drawings.

DETAILED DESCRIPTION OF THE DRAWINGS

In all of the figures, the same elements are indicated by the same reference numbers.

Referring to the figures, a wheel carrier, which can also be termed a pivot bearing, has the reference number 1, because a vehicle wheel is rotatably mounted about its axis A on the wheel carrier 1 and/or pivot bearing 1, in a fundamentally conventional manner, and can be pivoted, together with this wheel carrier 1, about a swivel axis S which runs substantially vertical, in order to make it possible to set, in a modifiable and specific manner, a wheel toe angle, to a relatively small degree, by use of an actuator 2. The wheel carrier 1 is guided with respect to the figuratively not-illustrated vehicle body by a longitudinal control arm 3, which is substantially oriented in the longitudinal direction of the vehicle, as well as by two transverse control arms 4, 5, which are substantially oriented in the transverse direction of the vehicle. In the present case, the transverse control arms 4, 5 substantially overlap (cf. FIG. 3) when viewed in a vertical projection, but which nevertheless lie in different planes when viewed in the longitudinal direction of the vehicle (cf. FIG. 4), and do not intersect. Each transverse control arm 4, 5 has an inner bearing lug 4i, 5i on the end thereof, and another bearing lug 4a, 5a, wherein one rubber bearing 6 (which is only visible on the inner bearing lugs 4i, 5i) is press-fit into each said bearing lug.

The longitudinal control arm 3 has a sheath 3a on its front end in the direction of travel, which holds a bearing (which is not illustrated), and via which this front end of the longitudinal control arm 3 is attached to the vehicle body b3. In the rear region thereof, the longitudinal control arm 3 has two mounting links 3b close to its upper edge and two mounting links 3b close to its lower edge, of which each describes a plane lying at least approximately perpendicular to the longitudinal axis of rotation. Also, it is hereby expressly stated that an inclination of the plane formed by the mounting links 3b, said inclination being most visible in FIG. 3 and being at an angle less than 90° with respect to the longitudinal axis of rotation L, should be included within the meaning of the phrase, "lying at least approximately perpendicular to the longitudinal axis of rotation."

Figure 1:
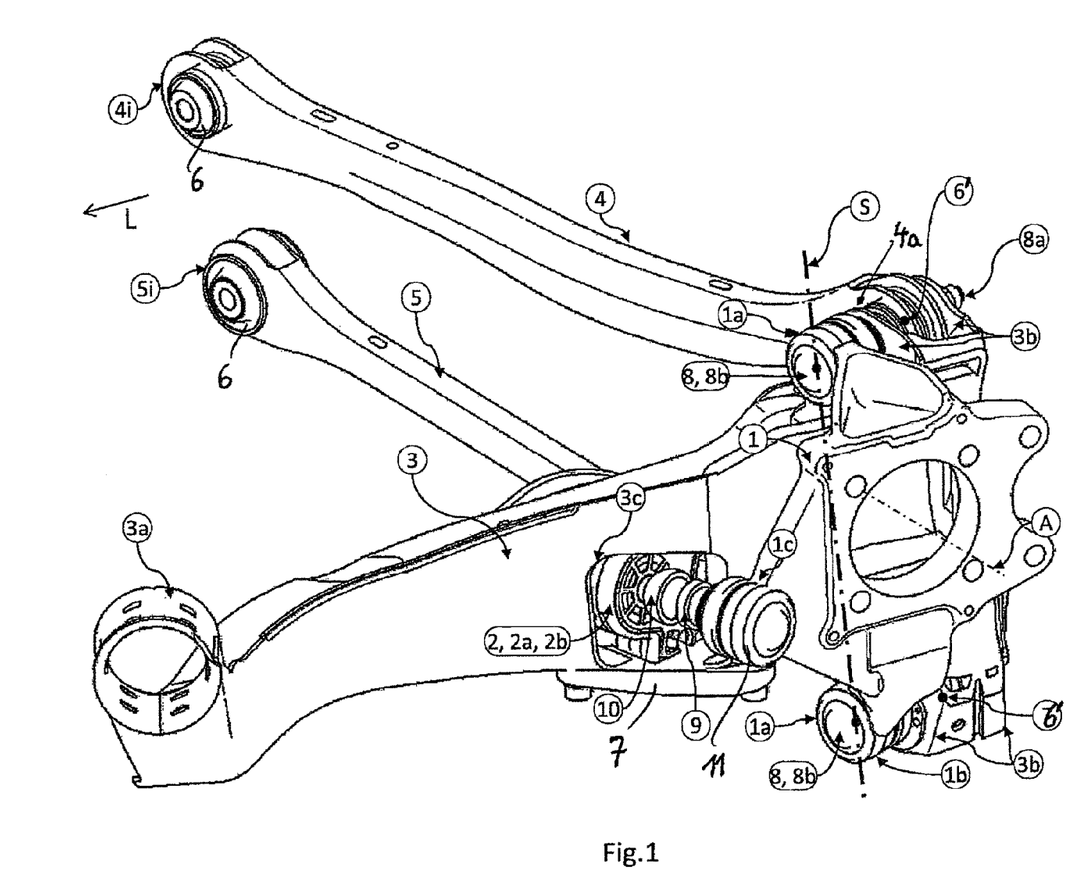
FIG. 1 is a perspective top view of a suspension, according to an embodiment of the invention, of the left rear wheel of a passenger vehicle.
Figure 2:
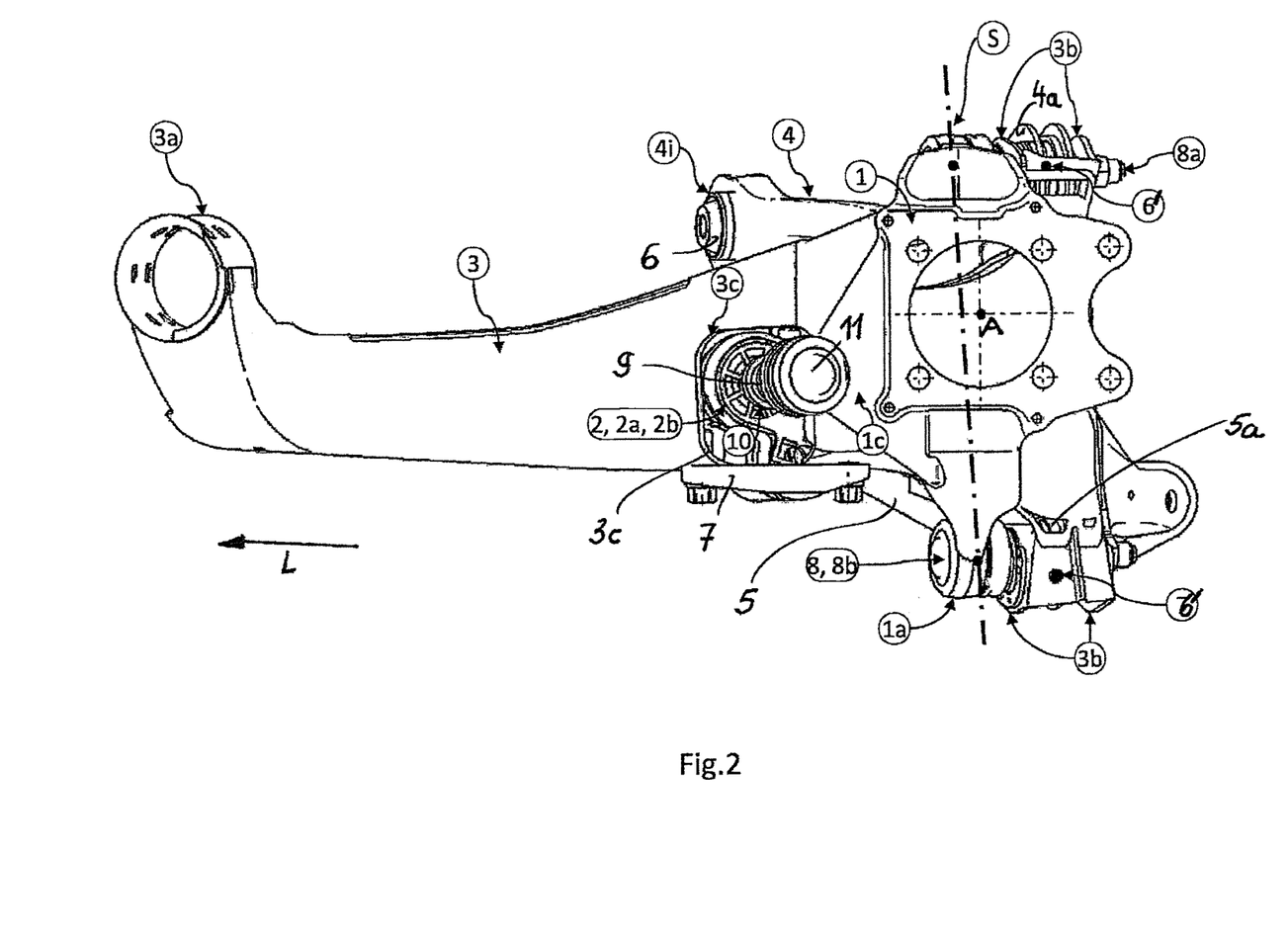
FIG. 2 is a horizontal side view of the suspension of FIG. 1.
Figure 3:
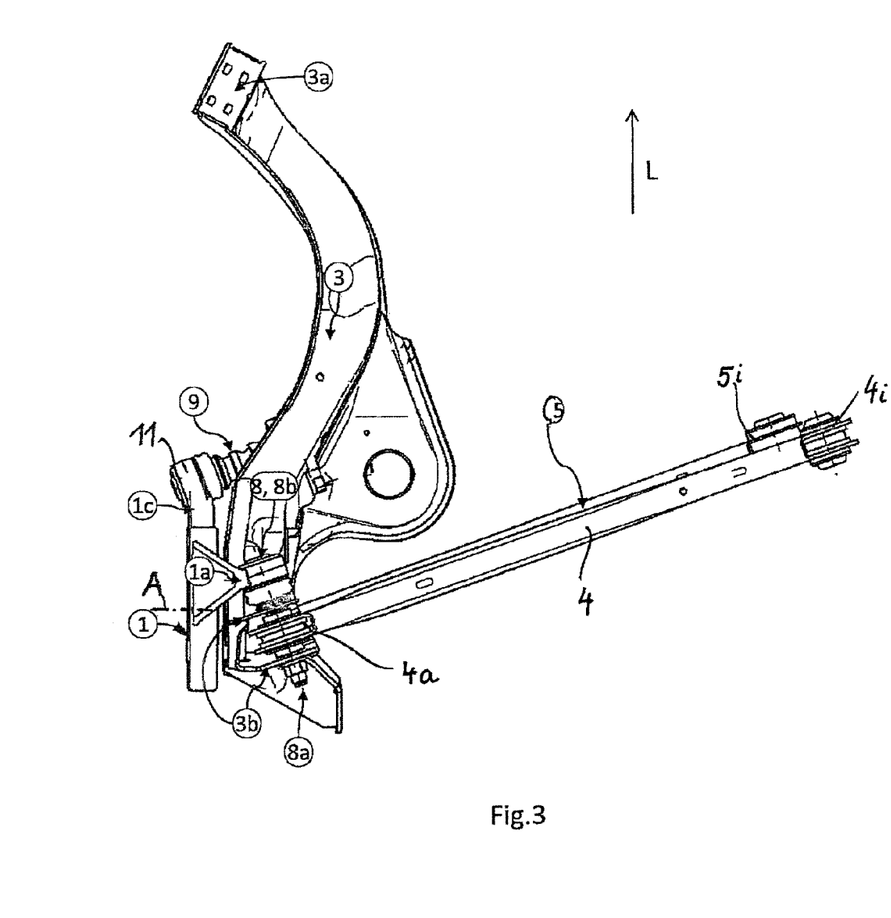
FIG. 3 is a top view from above of the suspension of FIG. 1.

The outer bearing lug 4a of the upper transverse control arm 4 is positioned between the two upper mounting links 3b of the longitudinal control arm 3, and the outer bearing lug 5a of the lower transverse control arm 5 is positioned between the two lower mounting links 3b of the longitudinal control arm 3. The rubber bearings 6 configured in the bearing lugs 4a, 5a, the center point of which is indicated by the reference number 6' in FIGS. 1 and 2, are attached to the wheel carrier 1 by way of a bolt 8a which passes through the mounting links 3b, as is explained in the paragraph below. As such, each transverse control arm 4, 5 is therefore able to pivot about an axis which is oriented at least approximately in the longitudinal direction of the vehicle (and which thereby is formed by the bolt 8a) with respect to the wheel carrier 1, in order to enable vertical movements between the wheel and the vehicle body, wherein the control arms 3, 4, 5 are either directly attached, in an articulated manner, on the vehicle body, or are indirectly attached in an articulated manner to the same, with an axle carrier in-between, by their ends which are opposite the wheel carrier 1.

The wheel carrier 1 has, in a segment thereof positioned in front of the wheel axis of rotation A with respect to the direction of travel of the vehicle, flanged bearings 1a arranged inwardly at upper and lower regions of the wheel carrier. The flanged bearings 1a also, like the mounting links 3b of the longitudinal control arm 3, each describe a plane which is at least approximately perpendicular to the longitudinal axis of rotation, wherein the planes formed by the flanged bearings 1a of the wheel carrier 1 are substantially parallel to the planes formed by the mounting links 3b of the longitudinal control arm 3. Each flanged bearing 1a has a cylindrical recess, wherein in the present case one pivot joint 8 is press-fit into each of the same by its head and/or joint housing 8b. The pivot pins 8a, also termed bolts 8a, of the two pivot joints 8, the same known to a person skilled in the art, extend in this case rearwardly opposite the direction of travel of the vehicle in a substantially horizontal plane, and perpendicularly when in the assembled position on the planes formed by the flanged bearings 1a and mounting links 3b. In this case, the bolt 8a and/or the pivot pin 8a of the (for example in FIG. 1) upper pivot joint 8 is guided through the upper mounting link 3b, the same having a through-bore for this purpose, as well as through the rubber bearing 6 of the upper transverse control arm 4, and the bolt 8a and/or the pivot pin 8a of the (for example in FIG. 1) lower pivot joint 8 is guided through the lower mounting link 3b, the same having a through-bore for this purpose, as well as through the rubber bearing 6 of the lower transverse control arm 5. A nut, which does not have a reference number but which can be easily seen at least in FIG. 2, is threaded onto the free end of each bolt 8a and/or pivot pin 8a, the same provided with a threading at least in the end segment thereof, wherein therefore not only the respective transverse control arm 4 and/or 5, but also the longitudinal control arm 3 is attached on the wheel carrier 1 and tensioned against the same by way of the nut.

In this case, the swivel axis S running through the center point of the rubber joint, the same illustrated thickly in the figures, is formed by the articulation in the joint housings 8b of the two pivot joints 8, wherein at this point the wheel carrier 1 is able to pivot about the swivel axis S with respect to the composite formed by the longitudinal control arm 3 and the transverse control arms 4, 5. In this case, the exact positioning of the two flanged bearings 1a relative to each other determines the position of the swivel axle S in space; here, this swivel axle S is oriented to run substantially vertically. Of course—as indicated in the introduction to the description—(one) other joint arrangement(s) can also be included in place of one or both of the pivot joints 8, wherein the same serve to implement the corresponding, double-sided attachment between the wheel carrier 1, the longitudinal control arm 3, and the transverse control arms 4, 5, by means of two bolts 8 which are functionally comparable to the pivot pins 8a of the pivot joint 8.

The degree of freedom of the wheel carrier 1 described by the swivel axle S must of course be bound, and a tie rod element 9 is attached to the wheel carrier 1 in an articulated manner for this purpose. The tie rod element 9 extends substantially and/or at least sectionally in the transverse direction of the vehicle and is attached by its end which is opposite the wheel carrier 1 to the actuator 2, which was briefly mentioned above. Two possible embodiments are illustrated in FIGS. 4 and 5, described below. By means of a suitable control of this actuator 2, which is designed as an electric motor with a suitable gearing, by an electronic control device, the tie rod element 9 can be moved in the direction of the longitudinal axis thereof in such a manner that the rear wheel, carried by the wheel carrier 1, of the vehicle assumes a desired toe angle with respect to the longitudinal axis of rotation L.

In the embodiment according to FIG. 4, the tie rod element 9 is designed with two parts, and consists first of the pivot pin 9b of a further pivot joint 11, which is press-fit into a cylindrical recess included in a support flange 1c of the wheel carrier 1, substantially oriented in the transverse direction of the vehicle. As the second element of the tie rod element 9, a joint ball 9a is attached to the free end of this pivot pin 9b, and is inserted into a ball recess 10a which is included on the free end of an adjuster element 10 of the actuator 2. This adjuster element 10 of the actuator 2 can move in the manner of a spindle drive lengthwise, meaning in the longitudinal direction of the adjuster element 10, by way of an electric motor, in the gearing 2b of the actuator 2. The gearing 2b only is illustrated in fragments and is surrounded by a housing 2a. The gearing 2b has the electric motor, which is specifically controllable.

As can be seen in FIGS. 1-4, the actuator 2, with its housing 2a and the gearing 2b which connects thereto, is arranged partially inside the longitudinal control arm 3, the same designed as a hollow body, wherein a passage 3c is included in the side wall, the same facing away from the wheel carrier 1, of this longitudinal control arm 3, wherein at least the tie rod element 9 projects through the passage 3c. The passage 3c is relatively large in order to enable relative movements of the tie rod element 9 in the longitudinal direction of the vehicle and/or in the vertical direction, said relative movements being possible as the result of external forces applied to the vehicle wheel—as explained in the introduction to the description—as well as a movement of the tie rod element 9 in the transverse direction of the vehicle via the actuator 2. So that the gearing 2b and/or the adjuster element 10 of the actuator 2, or the electric motor thereof, does not incur any damage as a result of such relative movements of the tie rod elements 9 in the longitudinal direction of the vehicle and/or in the vertical direction, with respect to the longitudinal control arm 3 and the actuator 2 attached to the same, the tie rod element 9 is guided, in the manner of a stabilizer bar connecting link, on one end thereof, via the ball recess 10a having the joint ball 9a, and on the other end thereof via the ball joint of the pivot joint 11, in a manner which frees it from transverse forces and torques. In addition, it can be seen in the figures that the actuator housing 2a is attached to a support plate 7 which is bolted to the longitudinal control arm 3 on both sides of the border area of the passage 3c, extending beyond the same, and therefore compensates for the loss in stability caused by the passage 3c on the longitudinal control arm 3. In this case, the support plate 7 can by all means be a component of the actuator housing 2a.

In the embodiment according to FIG. 5, the actuator 2 is attached to the longitudinal control arm 3 as just described for FIGS. 1-4; however, the tie rod element 9 is designed differently than in FIG. 4. In the manner of a universal joint, a sleeve-like segment of the tie rod element 9 is connected to the end segment of the adjuster element 10 of the actuator 2 via a pivot pin 21 which is oriented substantially vertically, giving minimal play in the longitudinal direction of the vehicle (that is, effectively in a longitudinal hole of the adjuster element 10 with the semimajor axis in the longitudinal direction of the vehicle), and is mounted in a longitudinally movable manner in an elastic rubber ring element 22 which is inserted along with a sleeve element 23 surrounding the same in the manner of a rubber bearing into a suitable recess 24 in the longitudinal control arm 3. The tie rod element 9 as shown is attached in the support flange 1c of the wheel carrier 1 via a retaining nut 12 by a pin-like segment thereof which connects facing outward to the sleeve-like segment. When the actuator adjuster element 10 moves longitudinally in the transverse direction of the vehicle, the tie rod element 9 also moves in the transverse direction of the vehicle as desired.

A minimal vertical relative movement between the wheel carrier 1 and the longitudinal control arm 3 is partially supported via the sleeve-like segment of the tie rod element 9 in the rubber ring element 22, wherein this sleeve-like segment can be moved in the vertical direction relative to the adjuster element 10, by way of the pivot pin 21, such that this relative movement is not transmitted to the actuator adjuster element 10. A comparable configuration applies for a minimal relative movement occurring in the longitudinal direction of the vehicle between the wheel carrier 1 and the longitudinal control arm 3, due to the play, mentioned in the previous paragraph, between the pivot pin 21 and the adjuster element 10. The tie rod element 9 in this case therefore assumes, in addition to its original function of binding the degree of freedom of the wheel carrier 1 described by the swivel axle S, the further function of an additional element as described in the introduction of the description, via which, in addition to the pivot joints 8, the wheel carrier 1 is supported on the longitudinal control arm 3, such that in the present case the tie rod element 9 is effectively functionally integrated into an additional element which forms a further support.

In an alternative embodiment which is not shown here, the tie rod element 9 can also be integrated only geometrically into a suitable additional element, or a further support which is independent of the tie rod 9 can be configured between the wheel carrier 1 and the longitudinal control arm 3, realizing the degree of freedom necessary for a desired pivoting of the wheel carrier 1 about the swivel axle S.

Of course, further alternative embodiments are possible; by way of example, a single actuator arranged substantially centrally can be included for the two wheel carrier of the rear axis, just as a plurality of details, particularly of a constructive nature, can be designed very differently from the above explanations, without departing from the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle independent wheel suspension for a rear wheel of a double-track vehicle, comprising:
    a wheel carrier of the rear wheel;
    a longitudinal control arm extending in a longitudinal direction of the vehicle;
    two transverse control arms extending in a transverse direction of the vehicle, the two transverse control arms being positioned in different height planes viewed in the longitudinal direction of the vehicle and not intersecting one another;
    an actuator operatively configured to at least minimally steer the rear wheel, wherein the actuator is a dedicated actuator assigned to a respective wheel carrier and being mounted on the longitudinal control arm attached to the wheel carrier;
    wherein first ends of the transverse control arms opposite the wheel carrier have respective articulated connections to a vehicle body, and second ends of the transverse control arms are attached to the wheel carrier by way of respective bolts via respective joints having a minimal degree of rotary freedom;
    wherein the longitudinal control arm is also attached to the wheel carrier by way of the bolts that attach the transverse control arms to the wheel carrier, in each case via one joint having a minimal degree of rotary freedom such that the wheel carrier is swivelable relative to the longitudinal control arm about a swivel axis extending substantially vertically and formed by the joints;
    a tie rod element connected to the wheel carrier via an articulated joint, wherein the tie rod element binds a resulting degree of rotary freedom of the wheel carrier about the swivel axis; and
    wherein the tie rod element is movable in a transverse direction of the vehicle via the actuator.

2. The wheel suspension according to claim 1, wherein the joint having the minimal degree of freedom is operatively configured between the longitudinal control arm and the wheel carrier as a ball bushing joint or a pivot joint.

3. The wheel suspension according to claim 1, further comprising at least one joint configured in a functional chain of the tie rod element, said at least one joint being operatively configured to substantially isolate an adjuster element of the actuator from transverse forces and from torques that are not directed about an axis of the adjuster element.

4. The wheel suspension according to claim 2, further comprising at least one joint configured in a functional chain of the tie rod element, said at least one joint being operatively configured to substantially isolate an adjuster element of the actuator from transverse forces and from torques that are not directed about an axis of the adjuster element.

5. The wheel suspension according to claim 1, wherein the actuator is arranged substantially centrally relative to a transverse direction of the vehicle, wherein the actuator is a single actuator operatively configured for both wheel carriers of the rear wheels of the vehicle.

6. The wheel suspension according to claim 1, wherein the dedicated actuator is mounted on the longitudinal control arm in a rigid configuration.

7. The wheel suspension according to claim 1, wherein the dedicated actuator is mounted on the longitudinal control arm in an articulated manner such that a desired movement of the dedicated adjustor element of the actuator is transmitted in an unmodified form to the tie rod element connected to the adjustor element.

8. A vehicle independent wheel suspension for a rear wheel of a double-track vehicle, comprising:
    a wheel carrier of the rear wheel;
    a longitudinal control arm extending in a longitudinal direction of the vehicle;
    two transverse control arms extending in a transverse direction of the vehicle, the two transverse control arms being positioned in different height planes viewed in the longitudinal direction of the vehicle and not intersecting one another;
    an actuator operatively configured to at least minimally steer the rear wheel;
    wherein first ends of the transverse control arms opposite the wheel carrier have respective articulated connections to a vehicle body, and second ends of the transverse control arms are attached to the wheel carrier by way of respective bolts via respective joints having a minimal degree of rotary freedom;
    wherein the longitudinal control arm is also attached to the wheel carrier by way of the bolts that attach the transverse control arms to the wheel carrier, in each case via one joint having a minimal degree of rotary freedom such that the wheel carrier is swivelable relative to the longitudinal control arm about a swivel axis extending substantially vertically and formed by the joints;
    a tie rod element connected to the wheel carrier via an articulated joint, wherein the tie rod element binds a resulting degree of rotary freedom of the wheel carrier about the swivel axis;
    wherein the tie rod element is movable in a transverse direction of the vehicle via the actuator;
    wherein the wheel carrier is supported on the longitudinal control arm via a further support, the further support being in addition to the joints attached by the bolts; and
    wherein the further support has at least one degree of freedom for pivotal movement of the wheel carrier by way of the actuator.

9. The wheel suspension according to claim 8, wherein the tie rod element is integrated into the further support.

10. The wheel suspension according to claim 8, wherein the joint having the minimal degree of freedom is operatively configured between the longitudinal control arm and the wheel carrier as a ball bushing joint or a pivot joint.

11. The wheel suspension according to claim 8, further comprising at least one joint configured in a functional chain of the tie rod element, said at least one joint being operatively configured to substantially isolate an adjuster element of the actuator from transverse forces and from torques that are not directed about an axis of the adjuster element.

12. The wheel suspension according to claim 10, further comprising at least one joint configured in a functional chain of the tie rod element, said at least one joint being operatively configured to substantially isolate an adjuster element of the actuator from transverse forces and from torques that are not directed about an axis of the adjuster element.

13. The wheel suspension according to claim 8, wherein the actuator is arranged substantially centrally relative to a transverse direction of the vehicle, wherein the actuator is a single actuator operatively configured for both wheel carriers of the rear wheels of the vehicle.

14. The wheel suspension according to claim 8, wherein the actuator is a dedicated actuator assigned to a respective wheel carrier and being mounted on the longitudinal control arm attached to the wheel carrier.

15. The wheel suspension according to claim 14, wherein the dedicated actuator is mounted on the longitudinal control arm in a rigid configuration.

16. The wheel suspension according to claim 14, wherein the dedicated actuator is mounted on the longitudinal control arm in an articulated manner such that a desired movement of the dedicated adjustor element of the actuator is transmitted in an unmodified form to the tie rod element connected to the adjustor element.

\* \* \* \* \*